US006816958B2

(12) United States Patent  (10) Patent No.: US 6,816,958 B2
Mashima  (45) Date of Patent: Nov. 9, 2004

(54) INFORMATION PROCESSING SYSTEM

(75) Inventor: Takao Mashima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 187 days.

(21) Appl. No.: 10/116,176

(22) Filed: Apr. 5, 2002

(65) Prior Publication Data

US 2003/0084268 A1 May 1, 2003

(30) Foreign Application Priority Data

Oct. 30, 2001 (JP) ........................................ 2001-331850

(51) Int. Cl.$^7$ ............................................ G06F 12/00
(52) U.S. Cl. ............................ 711/202; 711/4; 711/112
(58) Field of Search ............................ 711/4, 111, 112, 711/202; 710/1; 703/25; 434/323

(56) References Cited

U.S. PATENT DOCUMENTS

| | | | | | |
|---|---|---|---|---|---|
| 5,502,839 | A | * | 3/1996 | Kolnick ........................ | 710/1 |
| 6,041,386 | A | * | 3/2000 | Bello ............................. | 711/4 |
| 6,287,125 | B1 | * | 9/2001 | Dorcely ....................... | 434/323 |
| 6,304,940 | B1 | * | 10/2001 | Beardsley .................... | 711/112 |
| 6,418,509 | B1 | * | 7/2002 | Yanai et al. .................. | 711/112 |
| 6,438,646 | B1 | * | 8/2002 | Kitamura et al. ............ | 711/112 |
| 6,574,589 | B1 | * | 6/2003 | Shoyama ..................... | 703/25 |

FOREIGN PATENT DOCUMENTS

JP  9-258908  10/1997

OTHER PUBLICATIONS

Definition of "Drag and Drop", *Newton's Telecom Dictionary*, 12th Edition, 1997, p. 217.

* cited by examiner

*Primary Examiner*—Nasser Moazzami
(74) *Attorney, Agent, or Firm*—McDermott Will & Emery LLP

(57) ABSTRACT

An information processing system for managing data stored in two storage devices using different storage formats. The system includes a first disk device for storing data in a first format and a second disk device for storing data in a second format. An upper level device having a display unit and an input unit is connected to the first disk device and the second disk device, for accessing data of the first disk device in the first format and data in the second disk device in the second format. The display unit includes a user interface providing a first area for displaying data of the first disk device and a second area for displaying data of the second disk device. Instructions received from the input unit to transfer data between the first disk device and the second disk device are effected by designating data in the first area or the second area of the display unit, and moving the designated data to a destination area of the display unit. In response, the designated data is moved between the first disk device and the second disk device Thus, data transfers between the first and second disk devices having different storage formats are effected by selecting data shown on either areas of the display unit, and moving the selected data to a destination area on the display unit. In response, the designated data is moved from one of the disk devices to the other.

8 Claims, 12 Drawing Sheets

FIG.1
SYSTEM CONFIGURATION DIAGRAM

FIG.2
UI UNIT CONFIGURATION DIAGRAM

FIG.3
DATA SHARE STORAGE VOLUME DATA FORMAT

FIG.4
DATA SET MANAGEMENT TABLE

| VOLUME NAME | STATUS | ACCESSING HOST NAME | QUEUE | | | |
|---|---|---|---|---|---|---|
| | | | 1 | 2 | 3 | .. |
| DATA SET 1 | LOCKED | SUN1 | | | | |
| DATA SET 2 | FREE | | | | | |
| DATA SET 3 | LOCKED | HP3 | SUN2 | NT3 | | |
| DATA SET 4 | LOCKED | NT1 | | | | |
| DATA SET 5 | FREE | | | | | |
| : | | | | | | |
| | | | | | | |

FIG.5
DATA READING IN APPLICATION

FIG.6
DATA WRITING BY APPLICATION

FIG.7
UI UNIT SCREEN

FIG.8
FILE COPYING SCHEME

FIG.9
COPYING PROCEDURE 1
(DESIGNATE FILE TO BE COPIED)

FIG.10
COPYING PROCEDURE 2
(DESIGNATE COPY DESTINATION)

FIG.11
COPYING PROCEDURE 3 (DISPLAY "COPYING")

FIG.12
COPYING PROCEDURE 4 (COPYING COMPLETE)

FIG.13
SCREEN REFRESH PROCEDURE 1
(DESIGNATE REFRESH)

FIG.14
SCREEN REFRESH PROCEDURE 2
(AFTER REDISPLAY)

FIG.15
VOLUME PROPERTY DESIGNATION

FIG.16
VOLUME PROPERTY SCREEN
(DATA SET DISPLAY)

| DATA SHARE VOLUME PROPERTIES | | | | | | | |
|---|---|---|---|---|---|---|---|
| VOLSER: VOL002 | | | | | Device emulation type: 3390-3A | | |
| Dataset | DO | RF | BL | RL | DS | Ex(Cyl) | Ex(Trk) |
| ○ TESTDATA01 | SAM | FB | 27990 | 90 | 871 | 1000 | 0 |
| ○ TESTDATA02 | SAM | FB | 80 | 80 | 14 | 0 | 14 |
| ○ TEMPDATA01 | SAM | FB | 80 | 80 | 0 | 0 | 1 |
| ○ TEMPDATA02 | SAM | VB | 2564 | 256 | 120 | 1000 | 0 |
| ○ WORK100 | SAM | VB | 2564 | 256 | 80 | 500 | 0 |
| × TEMP03 | DAM | FB | 1000 | 100 | 0 | 500 | 0 |

[Close]

FIG.17
VOLUME PROPERTY DISPLAY

FIG. 18

DATA UPDATE PROCEDURES

FIG.19
DATA SET UPDATE PROCEDURE 1
(OPERATION DESIGNATION)

FIG.20
DATA SET UPDATE PROCEDURE 2
(EDIT SCREEN)

INFORMATION PROCESSING SYSTEM

BACKGROUND OF THE INVENTION

1. Field of the Invention

This invention relates to a method whereby a system that is configured by multiple hosts operating with mutually different operating systems has the same disks in common, and integratedly manages data, and more particularly to a method for handling the data on all of these disks by a user interface screen.

2. Description of the Related Art

In recent years, with down-sizing being widely implemented, work conventionally done by mainframe computers has come to be processed by open systems configured of personal computers or work stations or the like. When a disk device is accessed from a host, with a mainframe, the disk is accessed via an interface standardized so that a cylinder number, head number, and record number are designated, and a data record is transferred in a count key data format. With an open system, on the other hand, the disk is accessed via an interface standardized so that a logical block address is designated and a data block is transferred. For that reason, disks generally used with a mainframe cannot be accessed with an open system. Conversely, disks used with an open system cannot be accessed with a mainframe. In order to resolve such problems as these, a computer system has been disclosed in Japanese Patent Application Laid-Open No. H9-258908/1997 that, in a system wherein a plurality of hosts are connected to one disk, accesses data from the hosts and shares data in common. Application programs have also been developed that are able to access disks that are formatted differently. With these, however, the user consciously performs data transfers between the mainframe and the open system by accessing a disk either directly or via a LAN, and data are held and used respectively on the mainframe end and on the open system end.

This is the same also in data warehouse or on-line processing of recent years. The operations end up being such that on-line processing wherewith the latest data are always handled and updating processing comes in every time is still implemented on the mainframe end, and only data warehouse type processing wherewith data of some time period are replicated and used even if not the latest data is implemented on the open system.

SUMMARY OF THE INVENTION

Conventionally, for data handled by a mainframe host, a count key data format is used. Data handled by an open system are in logical block format. It is therefore necessary for data to be separately held on the mainframe end and on the open system end. In order to use data between two different hosts, moreover, the user must be conscious of the host handling those data and the data format thereof, and implement such procedures for using data after transferring those data from the host managing those data to the host that will use those data, and transferring the data back again after they are used.

In the present invention, by loading an application capable of reading and writing data that are in the count key data format, into an open system host, a count key data volume is accessed from both the mainframe host and the open system host. That data share volume is then displayed on a user interface screen on the open system host. For that reason, a user is able to access data using the user interface screen as though handling his or her own local files, without being conscious of accessing data managed by a mainframe or other host, and without implementing procedures for transferring data from a host managing those data to a host that will use those data.

By connecting to a disk controller in conjunction with using switches or the like, moreover, access becomes possible to all data sharing disks connected in an SAN environment.

The information processing system of the present invention has: a first disk device for storing data in a first format; a first upper level device for accessing data in the first format, connected to the first disk device, and having management means for managing the first disk device; a second disk device for storing data in a second format; and a second upper level device that comprises interface means having a display unit and an input unit, is connected to the first disk device and the second disk device, and accesses data of the first disk device in the first format and data of the second disk device in the second format; wherein the interface means have, in the display unit, a first area for displaying data of the first disk device and a second area for displaying data of the second disk device, instruct, from the input unit, transfers of data between the first disk device and the second disk device by designating data in the first area or the second area and moving the designated data to an area at moving destination thereof, and perform movements of data, by instruction, between the first disk device and the second disk device.

In other words, in the information processing system based on the present invention, data are stored in a disk device having a count key data format that is the first format. To this disk device are connected a mainframe that accesses data using a cylinder number, head number, and record number as the address, and an open system that accesses data with a logical block address that is the second format. In the open system, moreover, an application is loaded that is capable of accessing data by designating a cylinder number, head number, and record number. And a utility having information on all data sets is loaded on the mainframe. That utility contains functions for managing the condition of the data sets, and functions for sharing the conditions of the data sets with another open system by communicating via a LAN with a communications utility on the other open system.

The user interface screen on the open system makes it possible to display names of all data sets in a data share storage volume, and to refer to and/or update the contents of the data sets. It also becomes possible to copy the data sets on a local disk on the open system.

When updating a data set, via the communications utility, it is possible to subject that data set to exclusive control so that it is not accessed from another system and either access the data set via the application, or to effect that by the same kind of control as with all the open system logical block volumes.

DESCRIPTION OF THE PREFERRED EMBODIMENTS

Figure 1:
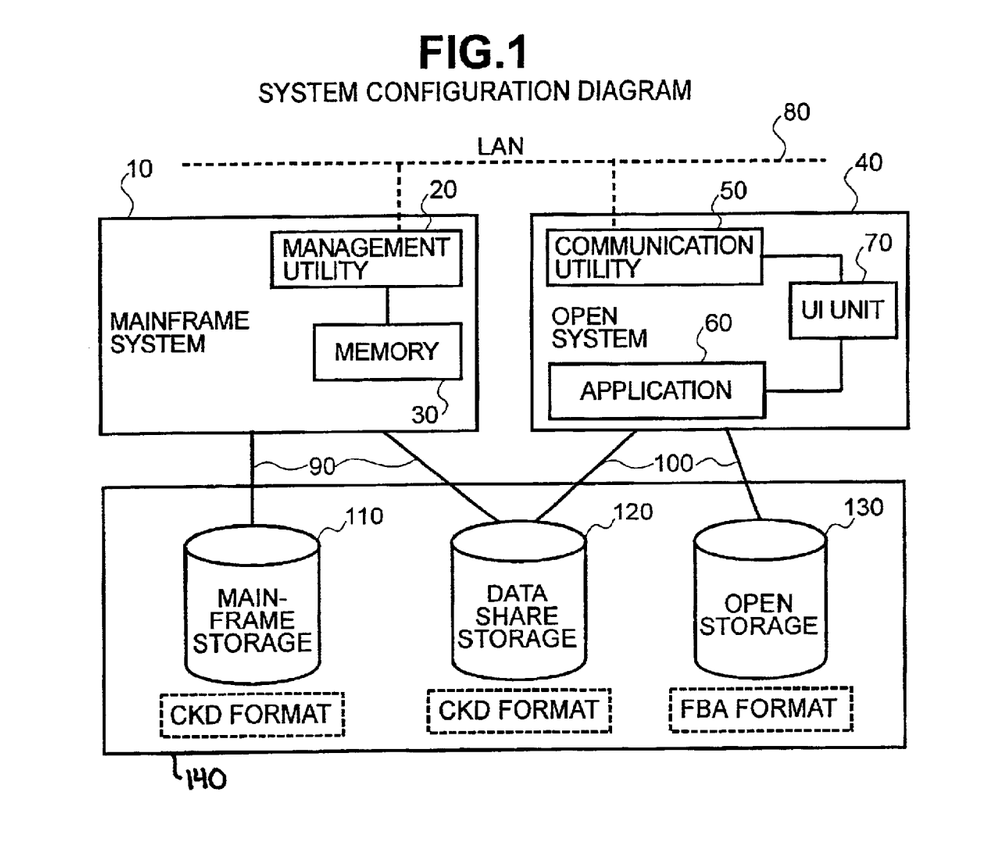
FIG. 1 is a system configuration diagram of a system based on the present invention.

The configuration of the system of this scheme is now described with reference to FIG. 1.

This system has a mainframe host 10 and an open system host 40 respectively connected to a disk controller 140 by ACONARC 90 and Fibre/SCSI 100. The mainframe host 10 and open system host 40 are connected by a LAN 80. A data share storage 120 that is a volume for integratedly managing data, mainframe storage 110 that is a local volume for the mainframe host, and open storage 130 that is a local volume for the open system are loaded in the disk controller 140.

The volume format is the CKD (count key data) format for the mainframe storage, and FBA (fixed block architecture) for the open system storage. The data format of the data share storage is made the CKD format. In the mainframe host 10 are loaded a management utility 20 for managing data inside data share storage 120 and a memory 30 used by the management utility 20. The management utility 20 conducts communications with the open system host 40 via a LAN 80, and manages data accesses from the open system host 40 to data share storage 120.

In the open system host 40 are also a communications utility 50 for communicating with the management utility 20 by the LAN 80, an application 60 for making access by cylinder number, head number, and record number to the data share storage that is in the CKD format, and a UI unit 70 that is a unit for interfacing with the user. The UI unit 70 performs processing corresponding to control inputs implemented by the user, by controlling the communications utility 50 and the application 60.

The management utility 20 holds information on the condition of all data sets in the disks in a management table and continually performs condition updating processing. In terms of data set conditions, there is a free condition and a locked condition. Data sets in the locked condition are subjected to exclusive control to prevent data updating access from any but the system that did the locking. Referencing from other systems is allowed, however.

In order to perform this exclusive control, communications are effected with communications utilities on the open systems using the host name as a key, and responses are returned to data set conditions and various kinds of request.

The communications utility 50, one of which exists on each open system, communicates by LAN with the data set management utility on the mainframe, acquires information on the data sets and transfers data set handling requests. This utility is called up from the UI unit, and returns the condition of that data set and a handling request notice to the UI unit.

Figure 2:
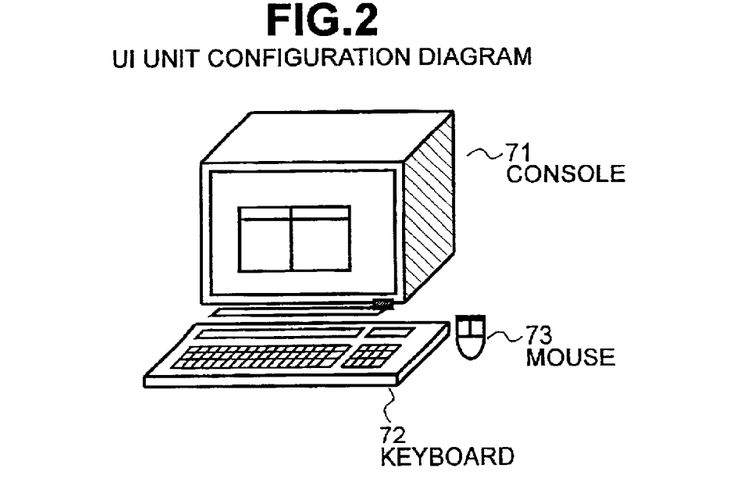
FIG. 2 is a diagram representing the configuration of a UI unit in a system based on the present invention.

FIG. 2 is a diagram of the configuration of the UI unit 70. The UI unit 70 is configured by a standard I/O device. The display unit of the UI unit is a console 71 that displays a screen (GUI). The input unit is configured by a keyboard 72 for making key entries and a mouse 73 for manipulating a cursor. For the mouse, a pointing device such as a track ball or track pad can also be used.

Figure 3:
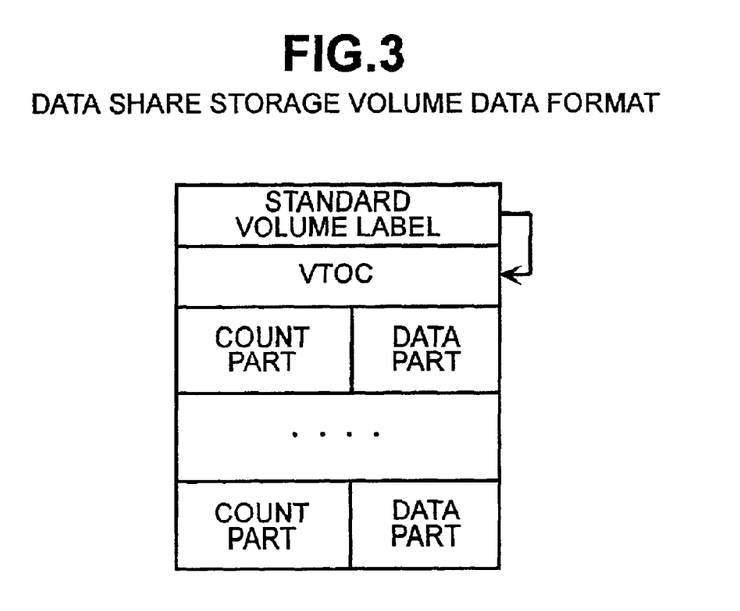
FIG. 3 is a diagram representing a data format for a data share storage volume.

FIG. 3 is a diagram that represents the data format for the data share storage 120. The standard volume label in cylinder 0, track 0, indicates that the VTOC (volume table of contents) resides in cylinder 0, track 1. In the VTOC are noted the names and addresses and the like of all the data sets contained in that volume. The portion wherein the count key data formatted data resides is from cylinder 0, track 2 on. The application 60, by referencing this VTOC, is able to display all the data sets in the data share storage 120 on the UI unit 70, and can also access those data sets.

Figure 4:
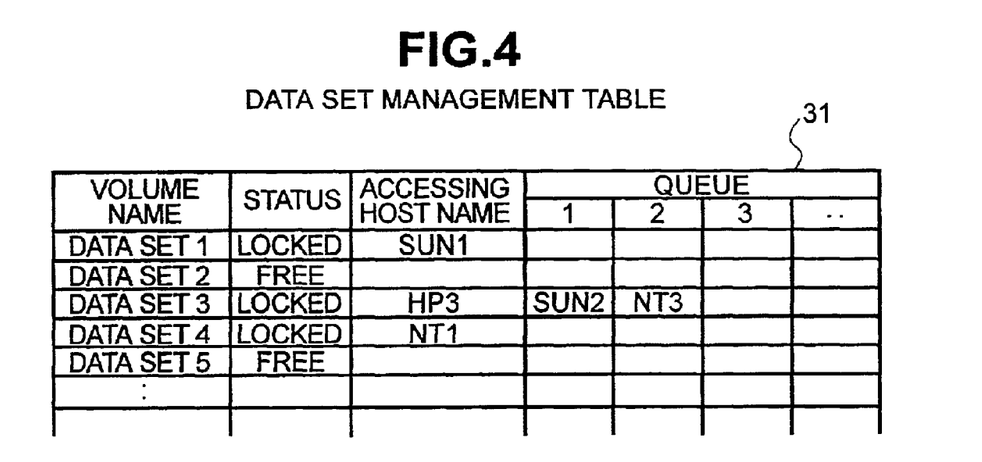
FIG. 4 is a diagram representing a management table contained in a management utility.

FIG. 4 is a management table which the management utility 20 in the mainframe host 10 has in the memory 30. This management table, which is prepared for each volume that is to constitute data share storage, is a table for queue-managing the conditions of data sets in the volume, the name of the host being accessed, and the host requesting to access those data sets. The management utility updates this table every time a request to access a data set is received, and maintains data integrity by excluding multiple accesses for a single data set.

An application loaded in an open system accesses a data share storage volume by cylinder number, head number, and record number.

The application first refers to the standard volume label written on the volume, and then refers to the VTOC. This application is able to refer to the VTOC and acquire the names of all data sets residing on that volume.

This application is also capable of referencing information on all the data sets in the VTOC, acquiring the cylinder numbers, head numbers, and record numbers that constitute the addresses of those data sets, retrieving only the data part of those data sets, and storing those data in a file system on an open system.

Conversely, when transferring an open system file to those data sets, this application can convert the data transferred from the open system to count key data formatted data by adding additional data such as a count part to the leading part of that data part, and then store the data in a count key data formatted disk.

Figure 5:
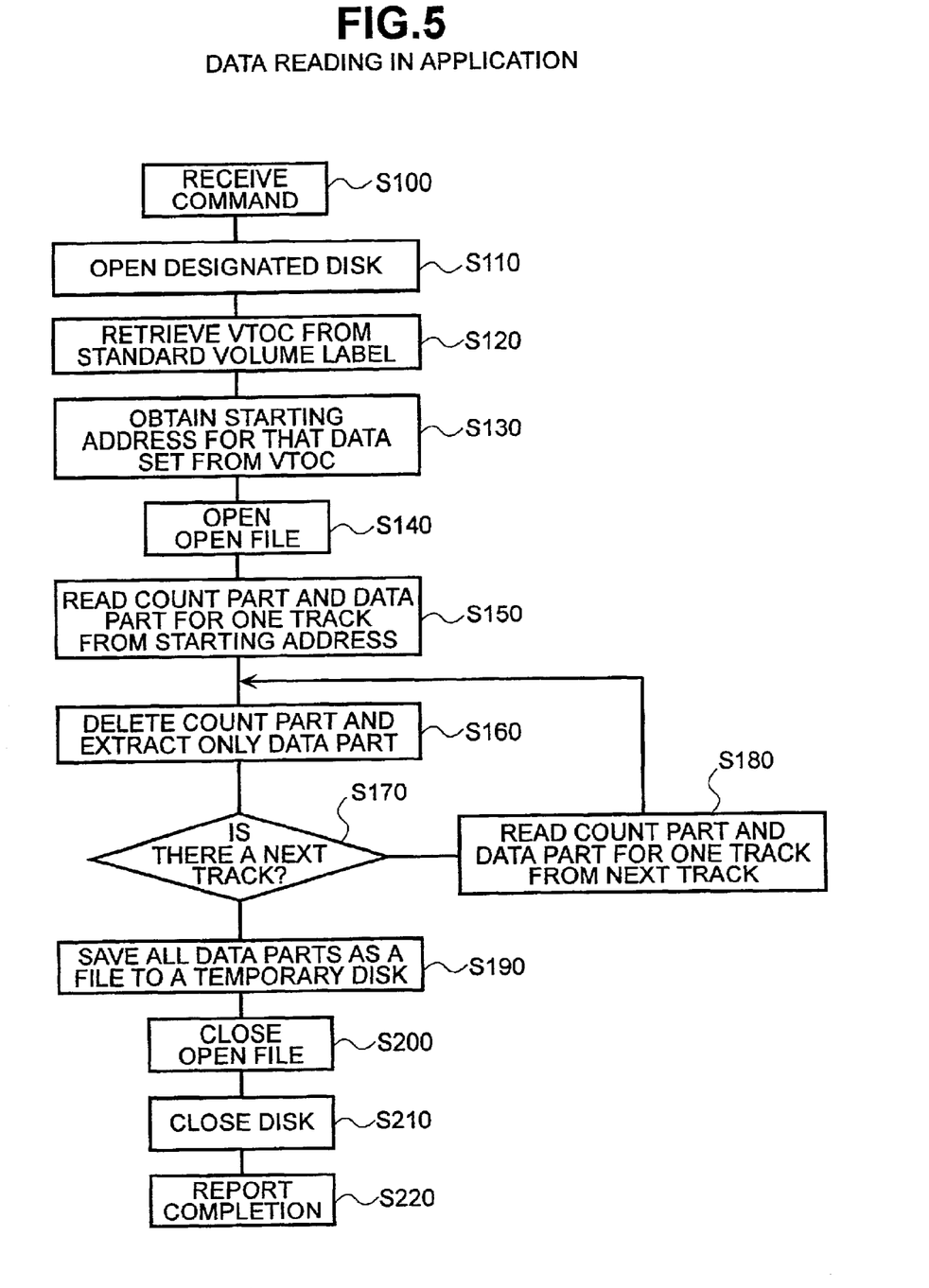
FIG. 5 is a flowchart for processing by an application to transfer data from a data share volume to an open volume.

In FIG. 5 are diagrammed the procedures by which the application 60 accesses the data share storage 120 and obtains data.

First, a data acquisition command is received (S100). The designated data share storage volume is opened (S110). The standard volume label in the volume is referred to, and the VTOC address is acquired (S120). The VTOC is referred to, information on the designated data set is acquired, and the data set opening address is found (S130). A temporary file for storing on the open end is opened (S140). The count part and data part for one track is read from the opening address of the data set (S150). The count part is deleted from the track read in S150 and only the data part is taken (S160). A judgment is made as to whether or not a next track exists in the data set (S170). If a next track does exist, the count part and data part for one track are read from the next track (S180). The operation of reading in the data for one track at a time, and removing the count part, is repeated until there is no longer a next rack. Then, when data set reading is complete, all the data parts taken are saved in open storage as a temporary file on the open side (S190). The open file is closed (S200), the data storage volume is closed (S210), and the completion of the process is reported (S220).

Figure 6:
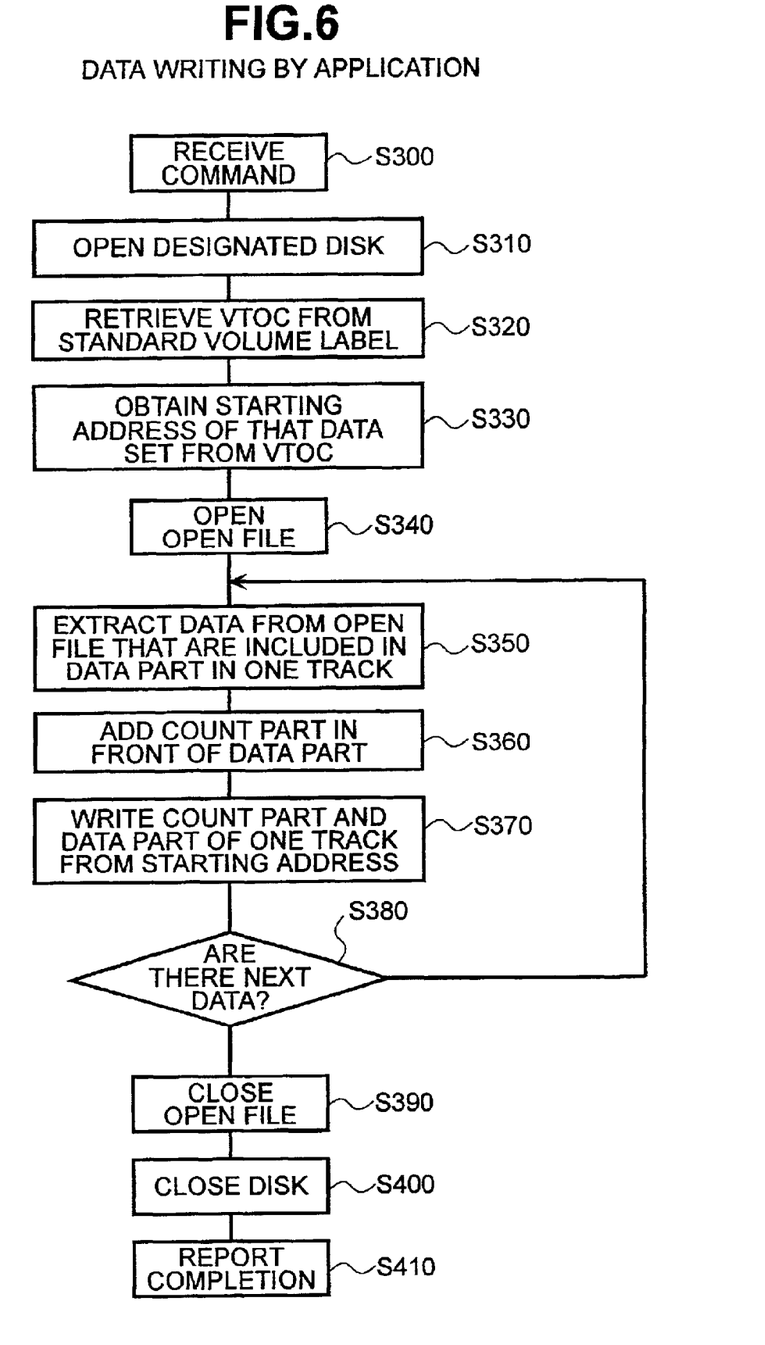
FIG. 6 is a flowchart for processing by an application to transfer data from an open volume to a data share volume.

A description is given next of the procedures used when the application 60 stores data in a data set in the data share storage 120 in FIG. 6.

A data write command is received (S300). The designated data share storage volume is opened (S310). The standard volume label in the volume is referred to, and the VTOC address is acquired (S320). The VTOC is referred to, information on the designated data set is obtained, and the data set opening address is found (S330). A temporary file for storing on the open end is opened (S340). A data quantity corresponding to the data part for one track of the data set is obtained (S350). A count part is added to the front of the obtained data (S360). The count part and data part for one track are written from the opening address of that data set in the data share volume (S370). A judgment is made as to whether or not there are still more data (S380). If there are still data, the operation of obtaining data, adding a count part, and writing one track of data from the next address is repeated. When all the data are completely written, the open file is closed (S390), the data share volume is closed (S400), and the completion of the process is reported (S410).

Figure 7:
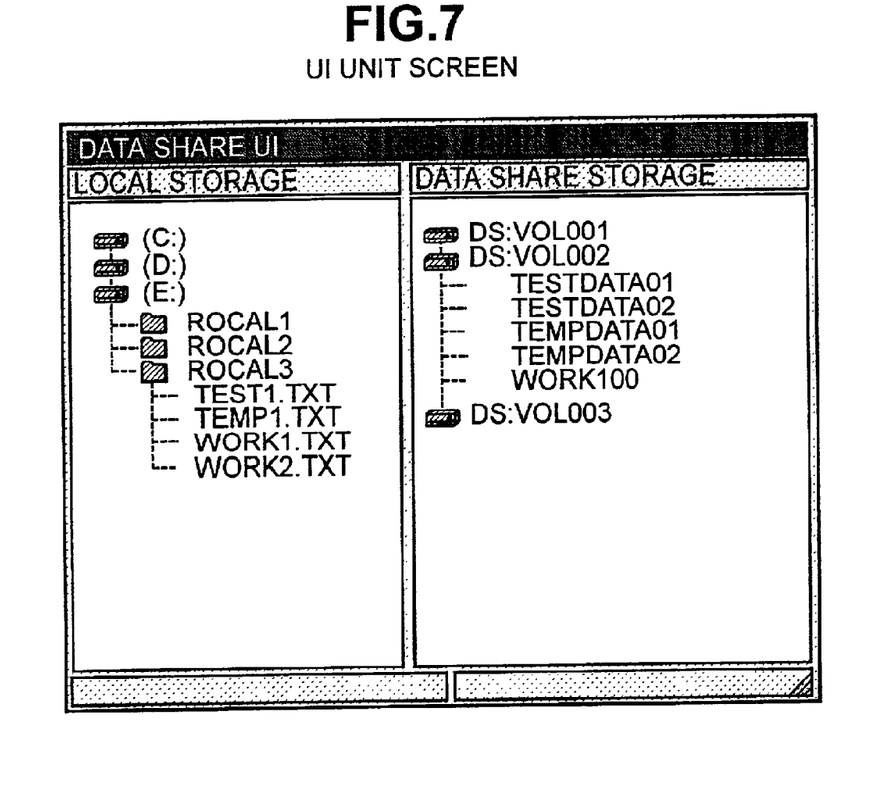
FIG. 7 is a diagram representing a user interface screen.

In FIG. 7 is diagrammed a user interface screen that displays a UI unit.

The UI unit resides in the open system host. A user can perform accesses relating to data sets by operating the UI unit. With the UI unit, data set names can be displayed, data set contents can be referred to and/or updated, and data sets can be downloaded. The UI unit has a screen for displaying a directory hierarchy structure (directory tree) and data file names in a window, and displays local disks in its own host on a local storage screen. All disks connected to can be displayed in like manner. That is, usable volumes are displayed as directories in a directory tree in the data share storage screen. Data sets in volumes are displayed just as files, moreover, and a file can be referred to by clicking on (designating) that file. By moving that file while clicking on (designating) it, copying can be done from a data set to an open system file. When copying an open system file to a data set, conversely, that is possible when no data are present in the data set in the data share storage. However, simply overwriting data is suppressed by adding an option, and data integrity is preserved.

In addition to the screen format, the UI unit is also capable of accepting command parameters. Many different kinds of processing can be implemented at any time by a user designating and calling up, to the UI unit, batch files in which command parameters are written. The commands provided by the UI unit include a reference read command that copies data in the data share storage to open storage, and update read and update write commands used when updating data. The update read and update write commands are always designated as a pair, but it is possible to designate any edit processing batch between the update read command and update write command. An overwrite command is also available as an option.

In the respective process routines, the UI unit uses a communications utility to communicate with a data set management utility. The application will access data stored in the count key data format.

Figure 8:
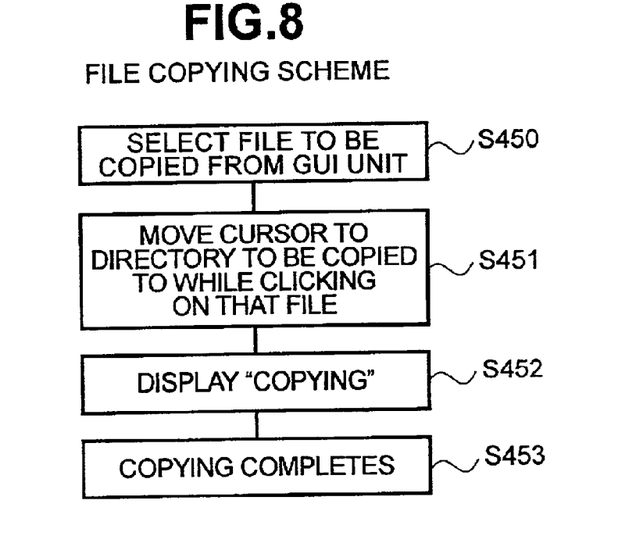
FIG. 8 is a flowchart for processing to copy a file.

In FIG. 8 are diagrammed the procedures for using the screen of the UI unit to copy a data set in the data share storage to local storage in the host. FIG. 9 to FIG. 12 are screens displayed as the procedures described in FIG. 8 are implemented.

Figure 9:
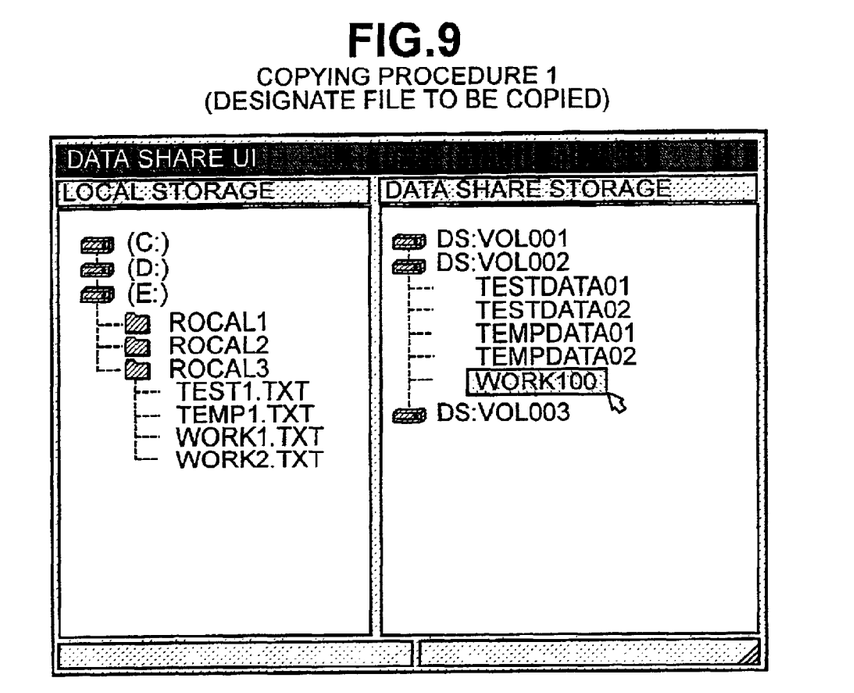
FIG. 9 is a diagram representing a file designation screen during copying processing.
Figure 10:
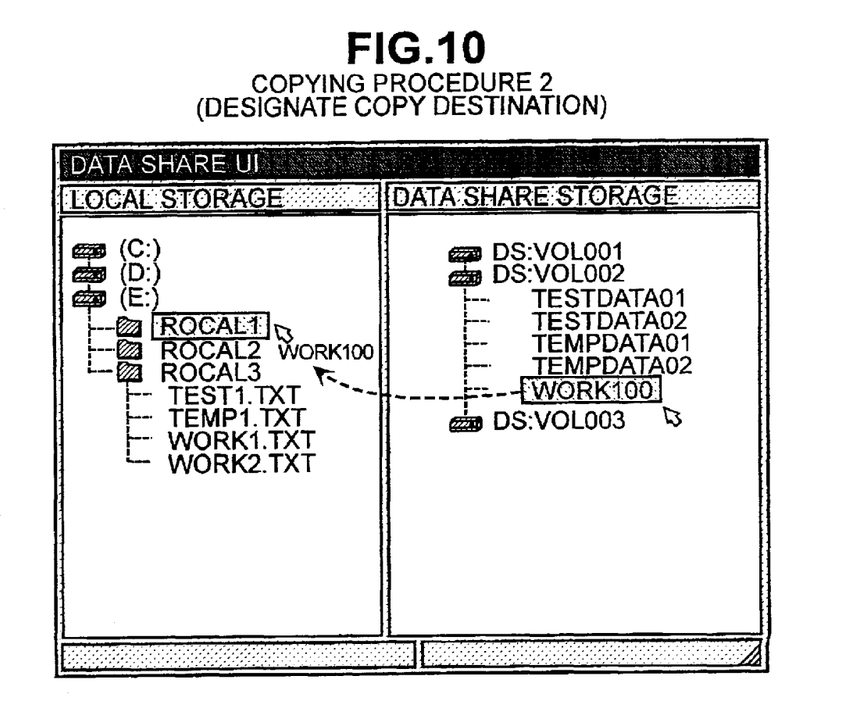
FIG. 10 is a diagram representing a copy destination designation screen during copying processing.

First, the file to be copied is selected from the screen (S450). The screen for this operation is given in FIG. 9. At this time, the file selected by the cursor on the screen will be displayed in color. In FIG. 9, the data set "WORK 100" is selected in volume "VOL 002" in data share storage. Next, while clicking on (designating) that data set, the cursor is moved to the directory to be copied to (S451). The screen at the time of this operation is given in FIG. 10. The broken line arrow in FIG. 10 indicates the movement of the cursor. The directory "LOCAL 1" on the E drive in local storage is designated as the directory to be copied to.

Figure 11:
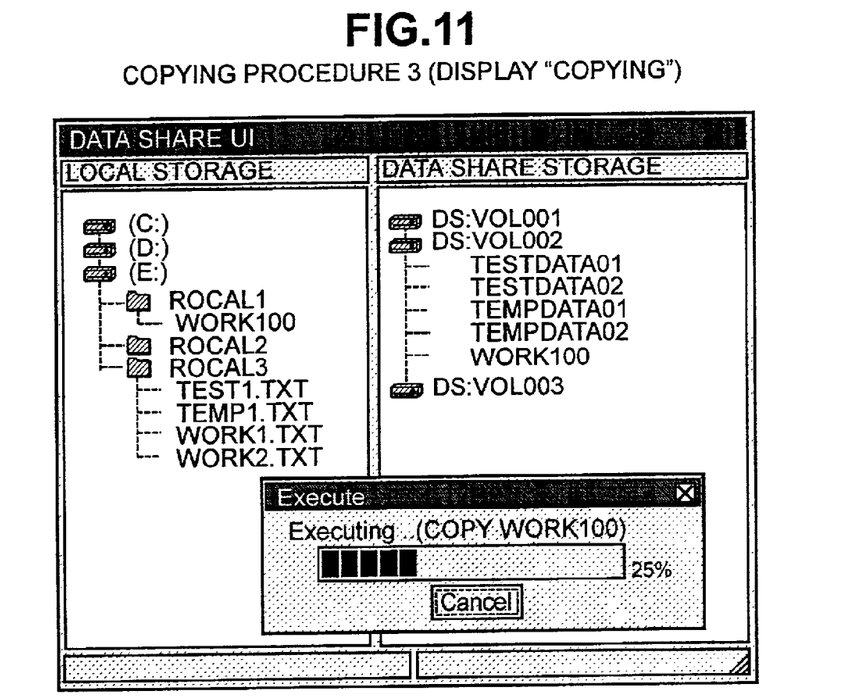
FIG. 11 is a diagram representing a copying-in-progress screen during copying processing.
Figure 12:
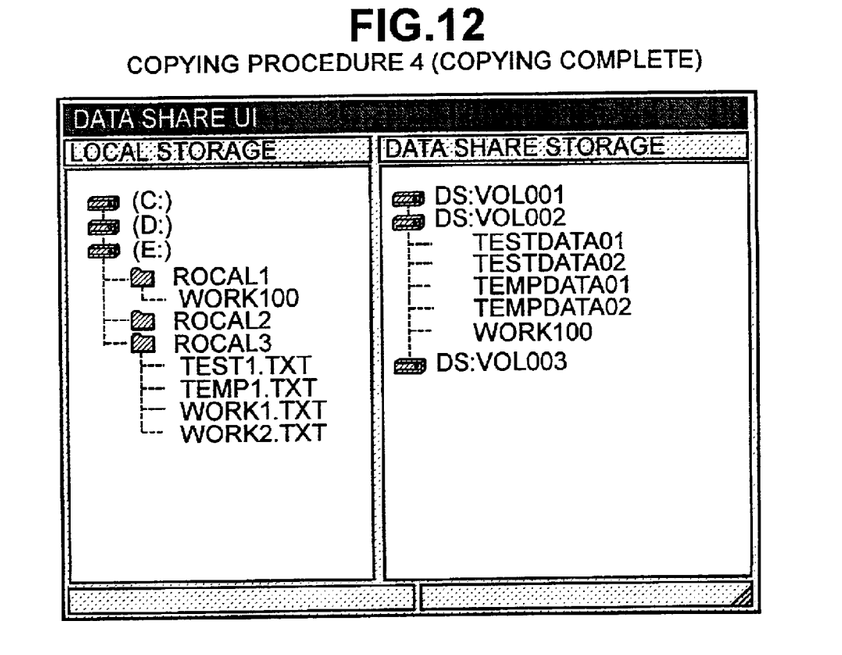
FIG. 12 is a diagram representing a completion screen during copying processing.

The copying of the file is started according to these designations (S452). In FIG. 11 is given the screen displayed during copying. The screen given in FIG. 12 is displayed when copying is finished (S453). In FIG. 12, it is evident that the designated data set "WORK 100" exists as the file "WORK 100" in the directory "LOCAL 1" in local storage.

These processes are implemented when the UI unit, in the procedure S451, issued a command to the application, and the processing indicated in FIG. 5 is activated. When copying or overwriting a file in the reverse direction, from local storage to data share storage, that is effected when the processing indicated in FIG. 6 is activated.

Figure 13:
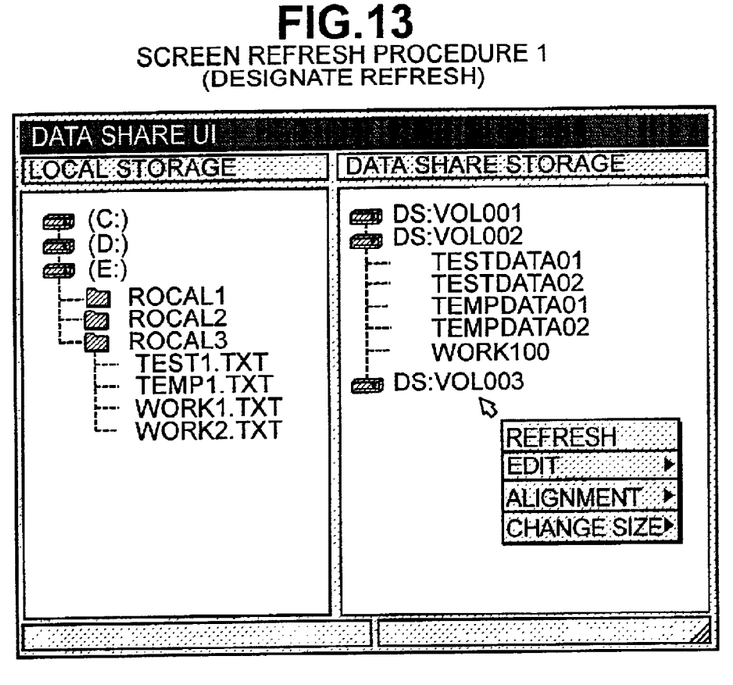
FIG. 13 is a diagram representing a designation screen during a screen refresh.
Figure 14:
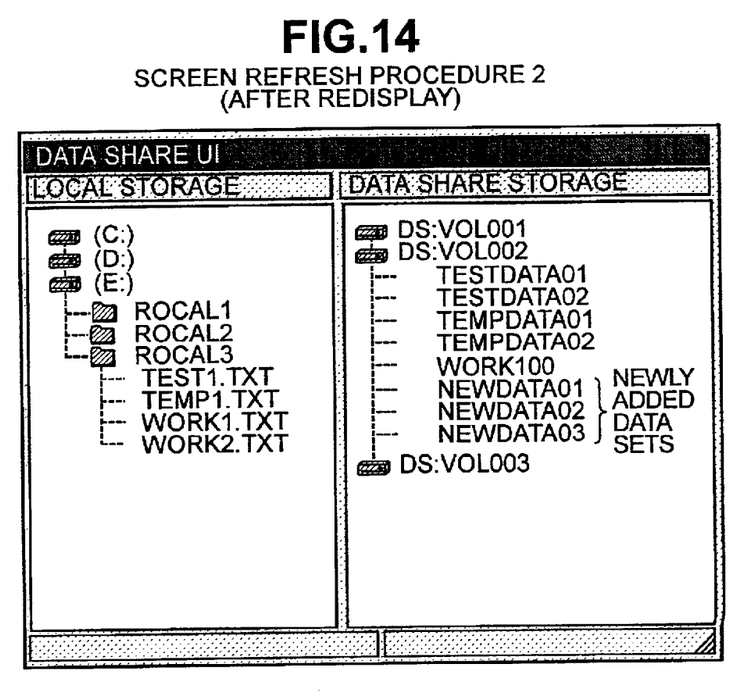
FIG. 14 is a diagram representing a screen after a screen refresh.
Figure 15:
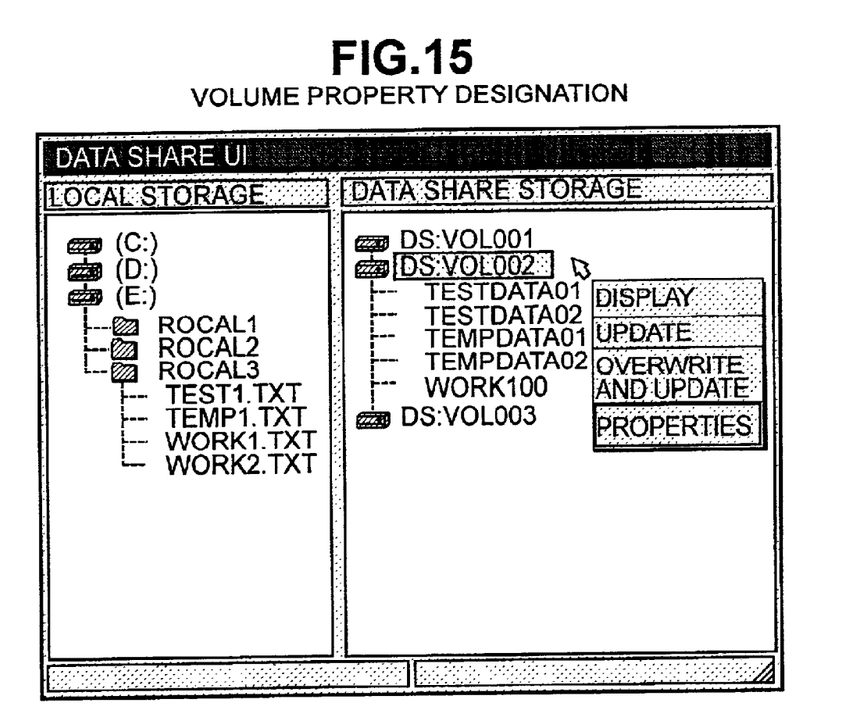
FIG. 15 is a diagram representing a designation screen during property display.
Figure 16:
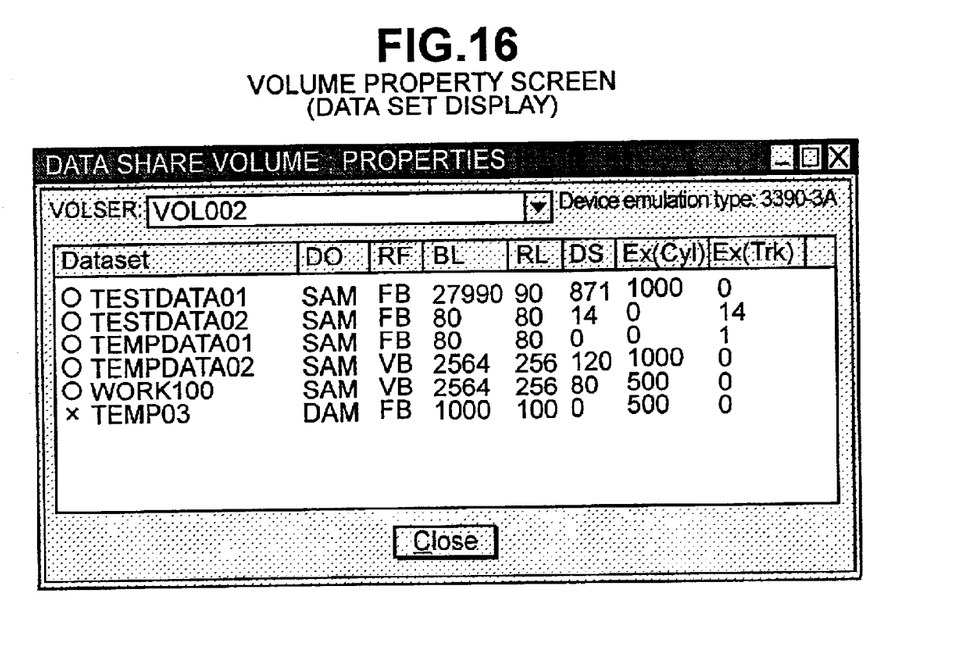
FIG. 16 is a diagram representing a property screen for a data share volume displayed on a user interface screen.

In FIGS. 13 and 14 are diagrammed screens displayed during operations to update displays on the user interface screen. In FIGS. 15 and 16 are diagrammed screens displayed during operations for displaying volume information on the user interface screen.

The user interface screen can be updated with the latest data information by selecting refresh. The refresh designating screen is given in FIG. 13. By right-clicking on the white background on the user interface screen, a screen is displayed wherefrom various kinds of operations can be designated. Here "refresh" is designated, and the screen displaying the latest information is given in FIG. 14. In FIG. 14, it is evident that the data sets "NEWDATA 01," "NEWDATA 02," and "NEWDATA 03" have been newly added.

Also, by selecting volumes in the same manner, and designating their properties, the attributes of all the data sets in those volumes can be displayed.

In FIG. 15 is given a screen for making designations, wherein the cursor has been positioned over the selected volume "VOL 002" and the properties have been designated by right-clicking. In FIG. 16 is given a property screen, being a screen wherein are displayed the attributes of all of the data sets, by designation from the screen given in FIG. 15. In the attributes are contained the following things: data set name (Dataset name), data set composition type (DO), record format (RF), block length (BL), record length (RL), data size (DS), and data set capacity (Ex) are displayed attached to their respective data set. On the right side of the data set name, moreover, an indication is given as to whether or not that data set can be accessed. A O mark indicates that the data set can be accessed, while a x mark indicates that it cannot be accessed.

Figure 17:
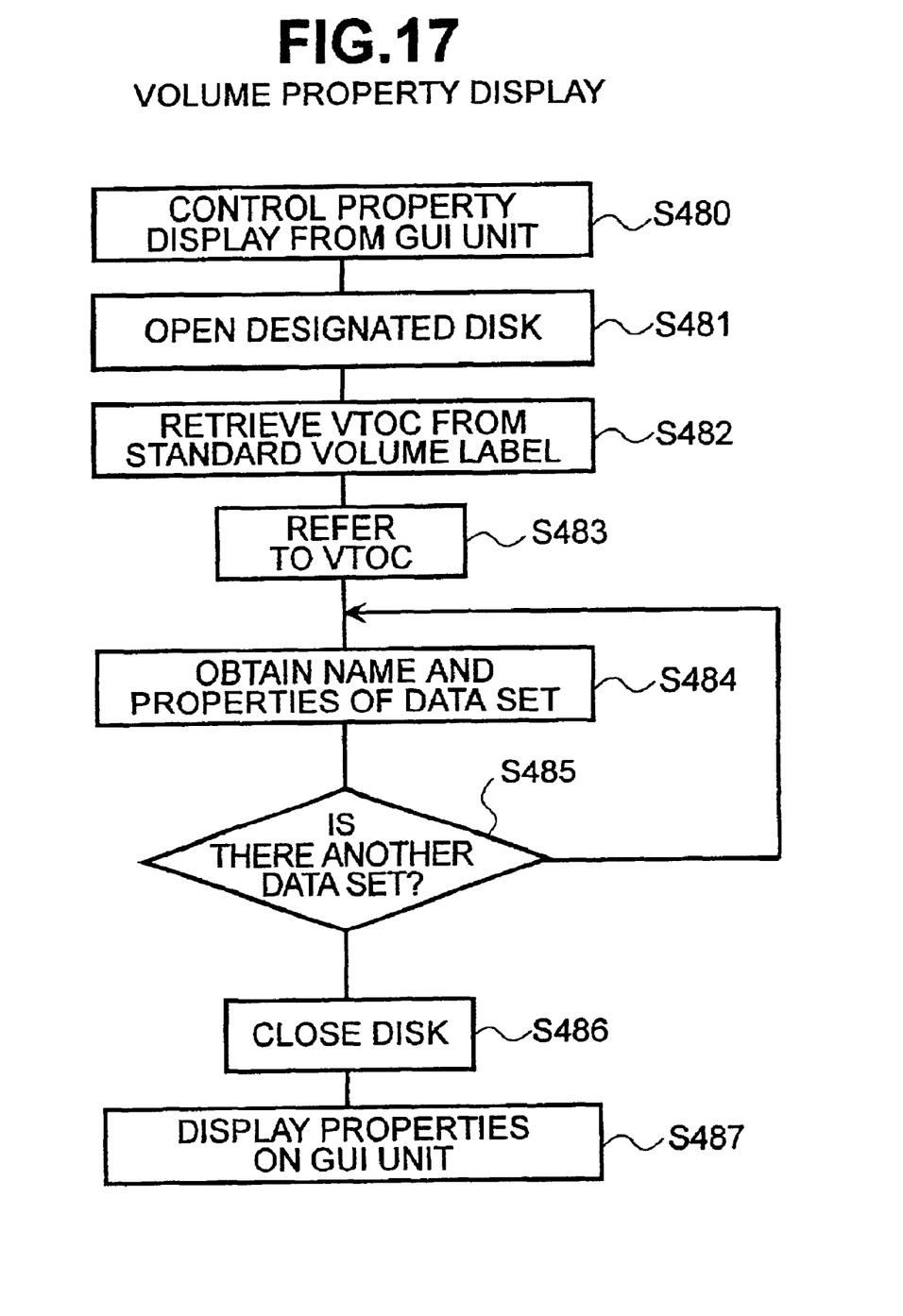
FIG. 17 is a flowchart for processing to display volume properties.

In FIG. 17 are represented the processing procedures implemented when an operation is performed to display volume properties. That is also effected by these processing means when the screen has been refreshed.

First, the name of the target volume which one wishes to display is selected from the user interface screen, and a property display operation is performed (S480). The application receiving the command to obtain data set information of that volume from the UI unit opens that volume (S481). The application retrieves the VTOC from the standard volume label in the volume (S482). The VTOC is referred to (S483) and the name and attributes of the data set are obtained (S484). A judgment is made as to whether or not other data sets exist (S485). When other data sets do exist, the data set information acquisition operation is repeated (S484). When all data set information has been acquired, that volume is closed (S486). The application sends all of the information obtained to the UI unit, and the UI unit displays that information on the property screen in the user interface screen (S487).

Figure 18:
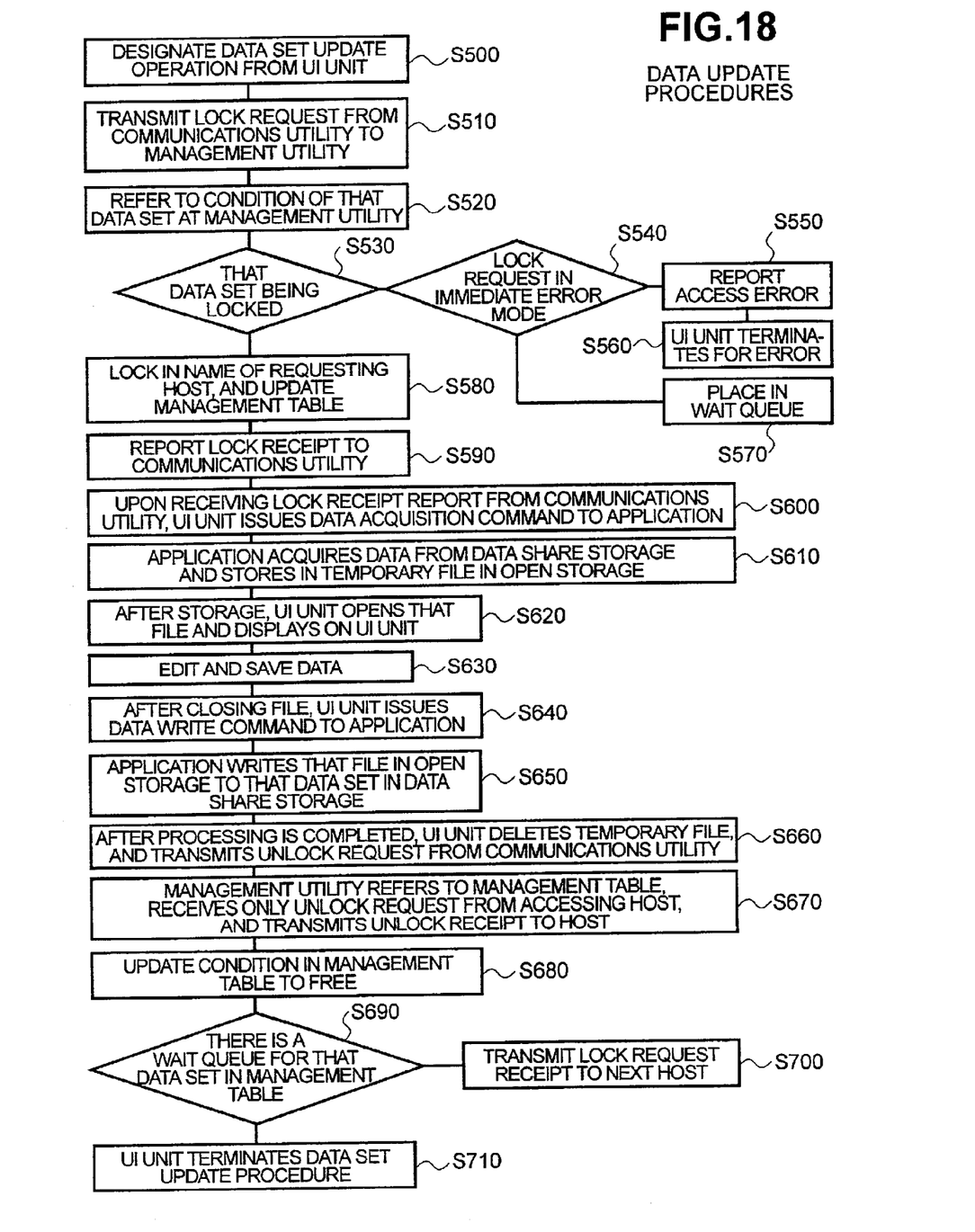
FIG. 18 is a flowchart for processing to update integratedly managed data.

In FIG. 18, the system-level procedures implemented when performing data updating processing are described. Data set updating processing is designated from the UI unit (S500). The UI unit uses the communications utility to transmit a lock request for that data set to the management utility (S510). In the management utility, the condition of that data set on the management table is referred to (S520). A judgment is made as to whether or not that data set is locked (S530). When it is locked, a reference is made to determine whether the lock request category is in the immediate error mode or not (S540). When it is in the immediate error mode, an access error is reported to the communications utility (S550), and the UI unit error-terminates (S560). When the lock request is not in the immediate error mode, the requesting host is registered in a wait queue for that data set (S570). When a lock request is received, if that data set is in a free condition, a lock is effected in the requesting host name, and the management table is updated (S580). The management utility reports lock request received to the communications utility (S590). A lock request report is received from the communications utility, and the UI unit issues a data set acquisition command to the application (S600). The application stores that data set in the data share storage volume in a temporary file in open storage (S610), and then the UI unit opens that file and displays it on the UI unit screen (S620). The user performs edit processing on the data (S630). When the file is closed, the UI unit issues a data write command to the application (S640). The application writes that file in open storage to the original data set in data share storage (S650). After the write processing is completed, the UI unit deletes the temporary file in open storage, and uses the communications utility to transmit an unlock request to the management utility (S660). The management utility refers to the management table, receives the unlock request if it is an unlock request from the accessing host, and transmits unlock received to the requesting host (S670). The condition of that data set in the management table is updated to free (S680). A judgment is made as to whether or not a wait queue exists for that data set (S690). If there is a wait queue, lock request received is reported to the next requesting host (S700). The UI unit, upon receiving unlock request received, terminates the data set updating processing (S710).

When referencing or copying a data set, the procedures are from S500 to S620, in terms of processing, the same as with updating processing.

Figure 19:
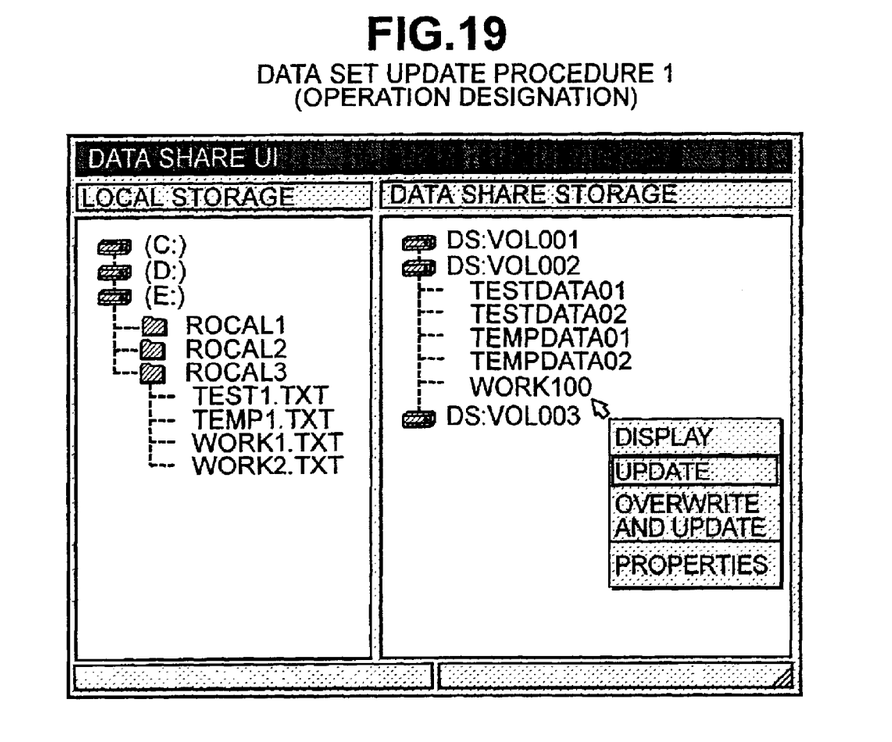
FIG. 19 is a diagram representing a designation screen when updating a data set.

In FIG. 19 is given a screen displayed when performing the processing "designation of data set update processing from UI unit (S500)" indicated in FIG. 18. By selecting the data set to be updated, and right-clicking on it, an operation on that data set is designated. Here, an "updating" operation is designated.

Figure 20:
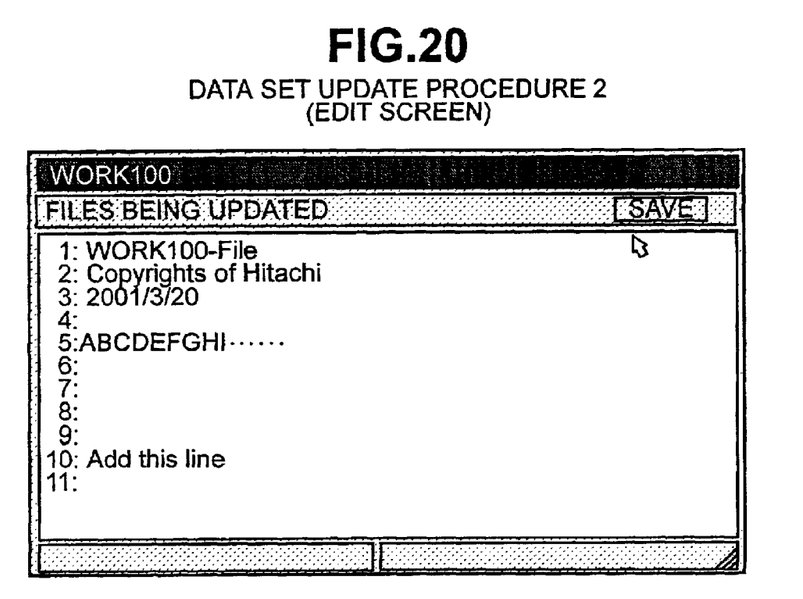
FIG. 20 is a diagram representing an edit screen when updating a data set.

FIG. 20 depicts an edit screen for performing the processing to "edit and save data (S630)" indicated in FIG. 18. When the user designates a data set update with the screen in FIG. 19, the data contents are displayed on the screen. After finishing the editing of the data set with this screen, by pushing "SAVE" at the upper right corner of the screen, the editing is saved, and the edit (update) operation terminates. By closing this screen, the user operation itself will terminate, but internally the processing from S640 on diagrammed in FIG. 18 will be executed and processing will be effected.

Based on the present invention, a user can access data without being aware of data format differences between a mainframe and an open system.

The user does not need to be aware of data transfers that become necessary due to differences in data format between the mainframe and the open system. That is, instead of the operation of transferring in and using data, it becomes possible to access all disks connected in an SAN environment, just as though accessing data on the host computer being used.

Based on the present invention, it becomes possible to implement on-line transaction processing, and not only a decision-making support system, and both data sharing and on-line operations can be effected without completely differentiating between the mainframe and the open system.

What is claimed is:

1. An information processing system comprising:
   a first disk device for storing data in a first format;
   a first upper level device, connected to said first disk device, having management means for managing said first disk device, for accessing data in said first format;
   a second disk device for storing data in a second format; and
   a second upper level device comprising interface means having a display unit and an input unit, connected to said first disk device and said second disk device, for accessing data of said first disk device in said first format and data in said second disk device in said second format; wherein
   said input unit has, in said display unit, a first area for displaying names of data of said first disk device and a third area for editing data of said first disk device;
   designations of data of said first disk device to be edited from said input unit are performed in said first area;
   said second upper level device stores data of said first disk device selected in said second disk device and displays those data in said third area; and
   editing of said designated data is performed in said third area.

2. The information processing system according to claim 1 wherein said first format is a count key data format that designates cylinder numbers, head numbers, and record numbers, and stores data; and said second format is a fixed length scheme that designates logical block addresses and accesses data.

3. The information processing system according to claim 1 in which said second upper level device comprises communications means connected to said interface means, and said information processing system has a network connected to said management means and said communications means, used for communicating when said management means manage said second upper level device via said communications means; wherein said communications means send data names of data designated by said input unit to said management means via said network; and said management means, while said designated data are being accessed or edited, performs exclusive control so that only said second upper level device that designated those data can update those data.

4. The information processing system according to claim 1 wherein said first area and said second area are windows for displaying directory hierarchical structures and data names; and said input means are a pointing device for designating data on a screen by moving a cursor on said screen.

5. An information processing system comprising:

a first disk device for storing data in a first format;

a first upper level device, connected to said first disk device, having management means for managing said first disk device, for accessing data in said first format;

a second disk device for storing data in a second format; and a second upper level device, comprising interface means having a display unit and an input unit, connected to said first disk device and said second disk device, for accessing data of said first disk device in said first format and data in said second disk device in said second format;

wherein:

said display unit includes a first area for displaying data of said first disk device and a second area for displaying data of said second disk device;

instructions from said input unit to transfer data between said first disk device and said second disk device are effected by designating data in said first area or said second area of said display unit, and moving the designated data to a destination area of said display unit;

the designated data is moved between said first disk device and said second disk device responsive to said instructions;

said second upper level device comprises communications means connected to said interface means, and said information processing system has a network connected to said management means and said communications means, used for communicating when said management means manage said second upper level device via said communications means; and said communications means send data names of data designated by said input unit to said management means via said network; and said management means, while said designated data is being accessed or edited, performs exclusive control so that only said second upper level device that designated those data can update those data.

6. An information processing system control method for an information processing system comprising:

a first disk device for storing data in a first format;

a first upper level device, connected to said first disk device, having management means for managing said first disk device, for accessing data in said first format;

a second disk device for storing data in a second format;

a second upper level device, connected to said first disk device and said second disk device, for accessing data of said first disk device in said first format and data of said second disk device in said second format, and having interface means having a display unit and an input unit, and communications means connected to said interface means; and a network, connected to said management means and said communications means, and used in communicating when said management means manage said second upper level device via said communications means; said information processing system control method comprising:

a step in which updating of data of said first disk device is designated from a first area on said display unit for displaying names of data of said first disk device;

a step in which said interface means use said communications means to transmit a lock request via said network, and said management means lock said data;

a step in which said second upper level device stores data of said first disk device in said second disk device;

a step in which said interface unit displays and edits contents of data stored in said second disk device in a third area in said display unit;

a step in which the data edited by said second disk device is stored in said first disk device; and a step in which said interface means use said communications means to transmit an unlock request via said network, and management means make said data free.

7. The information processing system control method according to claim 6, wherein said first format is a count key data format that designates cylinder numbers, head numbers, and record numbers, and stores data and said second format is a fixed length scheme that designates logical block addresses and accesses data.

8. The information processing system control method according to claim 6, wherein said first area and said second area are windows for displaying directory hierarchical structures and data names; and said input means is a pointing device for designating data on a screen by moving a cursor on said screen.

* * * * *